(12) United States Patent
Chen

(10) Patent No.: US 8,433,308 B2
(45) Date of Patent: Apr. 30, 2013

(54) APPARATUSES AND METHODS FOR UPDATING CONFIGURATIONS OF RADIO RESOURCES WITH SYSTEM INFORMATION

(75) Inventor: Te-Ming Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 112 days.

(21) Appl. No.: 13/096,687

(22) Filed: Apr. 28, 2011

(65) Prior Publication Data

US 2011/0269448 A1 Nov. 3, 2011

Related U.S. Application Data

(60) Provisional application No. 61/329,881, filed on Apr. 30, 2010.

(51) Int. Cl.
*H04M 3/00* (2006.01)

(52) U.S. Cl.
USPC .......................... 455/418; 455/422.1; 455/436

(58) Field of Classification Search ............... 455/422.1, 455/436, 418
See application file for complete search history.

(56) References Cited

U.S. PATENT DOCUMENTS

| | | | | |
|---|---|---|---|---|
| 2011/0105105 | A1* | 5/2011 | Sagfors et al. | 455/422.1 |
| 2011/0268085 | A1* | 11/2011 | Barany et al. | 370/331 |

OTHER PUBLICATIONS

ETSI TS 124 301 v9.2.0 (Apr. 2010); Universal Mobile Telecommunications System (UMTS); LTE; Non-Access-Stratum (NAS) protocol for Evolved Packet System (EPS); Stage 3 (3GPP TS 24.301 version 9.2.0 Release 9); pp. 1-278.
3GPP TS 36.331, V8.3.0, Sep. 1, 2008, Technical Specification Group Radio Access Network; Evolved Universal Terrestrial Radio Access (E-UTRA) Radio Resource Control (RRC); Protocol Specification (Release 8), XP-050377646, pp. 1-178.
3GPP TSG RAN WG2#63bis, Panasonic, "Clarification on connected UE behavior for handling system information," Sep. 29-Oct. 3, 2008, Prague Czech Republic, R2-085096, XP-050320037.

* cited by examiner

*Primary Examiner* — Barry Taylor
(74) *Attorney, Agent, or Firm* — Birch, Stewart, Kolasch & Birch, LLP

(57) ABSTRACT

A mobile communication device with a wireless module and a controller module is provided. The wireless module performs wireless transceiving to and from a service network. The controller module, configured in a connected mode according to configurations of at least one dedicated radio resource, receives a broadcast system information indicating configurations of common radio resources from the service network via the wireless module, and determines whether the common radio resources comprise at least one of the dedicated radio resource. Also, the controller module applies the configurations of the common radio resources, except for the dedicated radio resource comprised in the common radio resources, in response to the common radio resources comprising at least one of the dedicated radio resource.

16 Claims, 4 Drawing Sheets

APPARATUSES AND METHODS FOR UPDATING CONFIGURATIONS OF RADIO RESOURCES WITH SYSTEM INFORMATION

CROSS REFERENCE TO RELATED APPLICATIONS

This application claims priority of U.S. Provisional Application No. 61/329,881, filed on Apr. 30, 2010, and the entirety of which is incorporated by reference herein.

BACKGROUND OF THE INVENTION

1. Field of the Invention

The invention generally relates to handling configurations of radio resources in a mobile communication device, and more particularly, to apparatuses and methods for handling configurations of radio resources with system information in a mobile communication device configured in a connected mode.

2. Description of the Related Art

In a typical mobile communications environment, a User Equipment (UE), including a mobile telephone (also known as a cellular or a cell phone), a laptop computer with wireless communications capability, or a personal digital assistant (PDA) etc., may communicate voice and/or data signals with one or more service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

Take the LTE technology in compliance with the 3GPP TS 24.301 specification (referred to herein as the TS 24.301 specification) for example. An LTE system may broadcast system information, such as the Public Land Mobile Network (PLMN) ID of the LTE system, the parameters for controlling the cell selection and reselection procedure, and the configurations of the common radio resources, etc., for the UEs staying within the radio coverage of the LTE system. Specifically, the system information may be divided into a group of information blocks comprising a Master Information Block (MIB) and a plurality of System Information Blocks (SIBs), and is transmitted on the Broadcast CHannel (BCH). The MB contains a limited number of most essential and most frequently transmitted parameters that are needed to acquire other information blocks from the cell, and is transmitted on a Broadcast CHannel (BCH). SIBs may be further categorized into a plurality of types, including a System Information Block type 1 (SIB1), System Information Block type 2 (SIB2), and System Information Block type 3 (SIB3), etc., and each type of SIBs is used to carry a group of related system information. For example, a SIB1 contains the Non-Access Stratum (NAS) system information and UE timers and counters to be used in the idle mode and connected mode; a SIB2 contains the UTRAN Registration Area (URA) ID of the location where the UEs are at, and the configurations of the common radio resources; a SIB3 contains the parameters for controlling the cell selection and reselection procedure. Generally, for performing wireless transceiving to and from the LTE system, a UE configured in the idle mode is required to acquire the MIB, and SIB1 to SI8, and a UE configured in the connected mode is required to acquire the MIB, SIB 1, and SIB 8. In order to keep the system information up-to-date, a UE may need to re-acquire the system information when the last received system information expires or when notified by the service network that an update of the system information is required.

BRIEF SUMMARY OF THE INVENTION

In one aspect of the invention, a mobile communication device comprising a wireless module and a controller module is provided. The wireless module performs wireless transceiving to and from a service network. The controller module, configured in a connected mode according to configurations of at least one dedicated radio resource, receives a broadcast system information indicating configurations of common radio resources from the service network via the wireless module, and determines whether the common radio resources comprise at least one of the dedicated radio resource. Also, the controller module applies the configurations of the common radio resources, except for the dedicated radio resource comprised in the common radio resources, in response to the common radio resources comprising at least one of the dedicated radio resource.

In another aspect of the invention, a method for updating configurations of radio resources by a mobile communication device wirelessly connected with a service network is provided. The method comprises the steps of configuring the mobile communication device in a connected mode according to configurations of at least one dedicated radio resource, receiving, by the mobile communication device, the broadcast system information indicating configurations of common radio resources from the service network, determining, by the mobile communication device, whether the common radio resources comprise at least one of the dedicated radio resource, and applying, by the mobile communication device, the configurations of the common radio resources, except for the dedicated radio resource comprised in the common radio resources, in response to the common radio resources comprising at least one of the dedicated radio resource.

Other aspects and features of the present invention will become apparent to those with ordinarily skill in the art upon review of the following descriptions of specific embodiments of apparatuses and methods for updating configurations of radio resources.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Note that, the configurations of the dedicated radio resources may have already been received from a service network by a UE configured in the connected mode, before a system information update is required. According to the conventional specifications of the LTE technology, when a UE configured in the connected mode receives a new SIB2, it will apply the configurations of the common radio resources included in the new SIB2. However, there may be a situation where the common radio resources comprise one or more of the dedicated radio resources. In this case, the UE may mistakenly overwrite the configurations of the dedicated radio resources with the configurations of the common radio resources, and problems may occur for the wireless connection between the UE and the LTE system.

Figure 1:
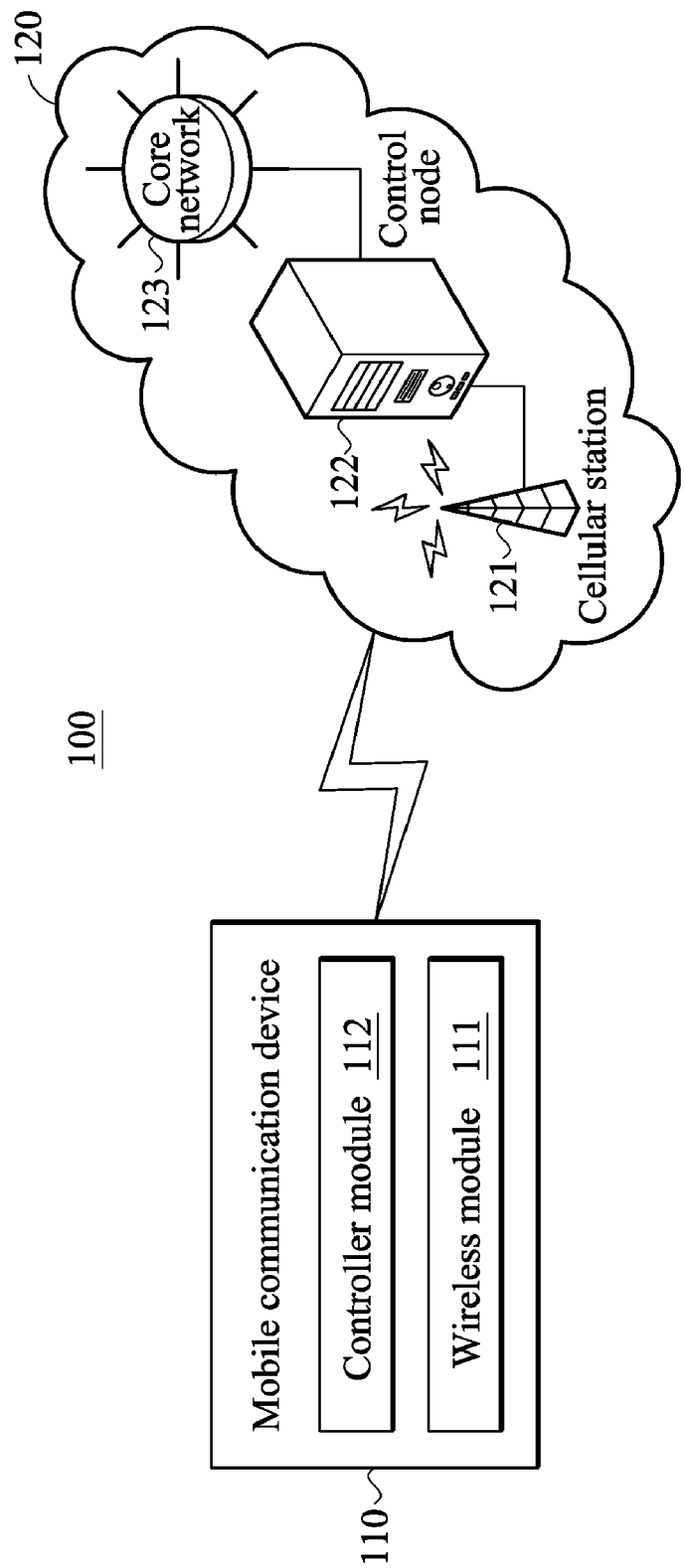
FIG. 1 is a block diagram illustrating a mobile communications environment according to an embodiment of the invention.

FIG. 1 is a block diagram illustrating a mobile communications environment according to an embodiment of the invention. In the mobile communications environment 100, the mobile communication device 110 is wirelessly connected to the service network 120 for obtaining wireless access services. The service network 120 comprises at least one cellular station 121 (or so-called base station or access station), at least one control node 122, and a core network 123, wherein the cellular station 121 is controlled by the control node 122 to provide the functionality of wireless transceiving for the service network 120. Though the control node 122 and the core network 123 are shown to be two separate components of the service network 120, the control node 122 and the core network 123 may be incorporated into one single component, and the invention is not limited thereto. The mobile communication device 110 comprises a wireless module 111 for performing the functionality of wireless transceiving to and from the service network 120. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others.

Figure 2:
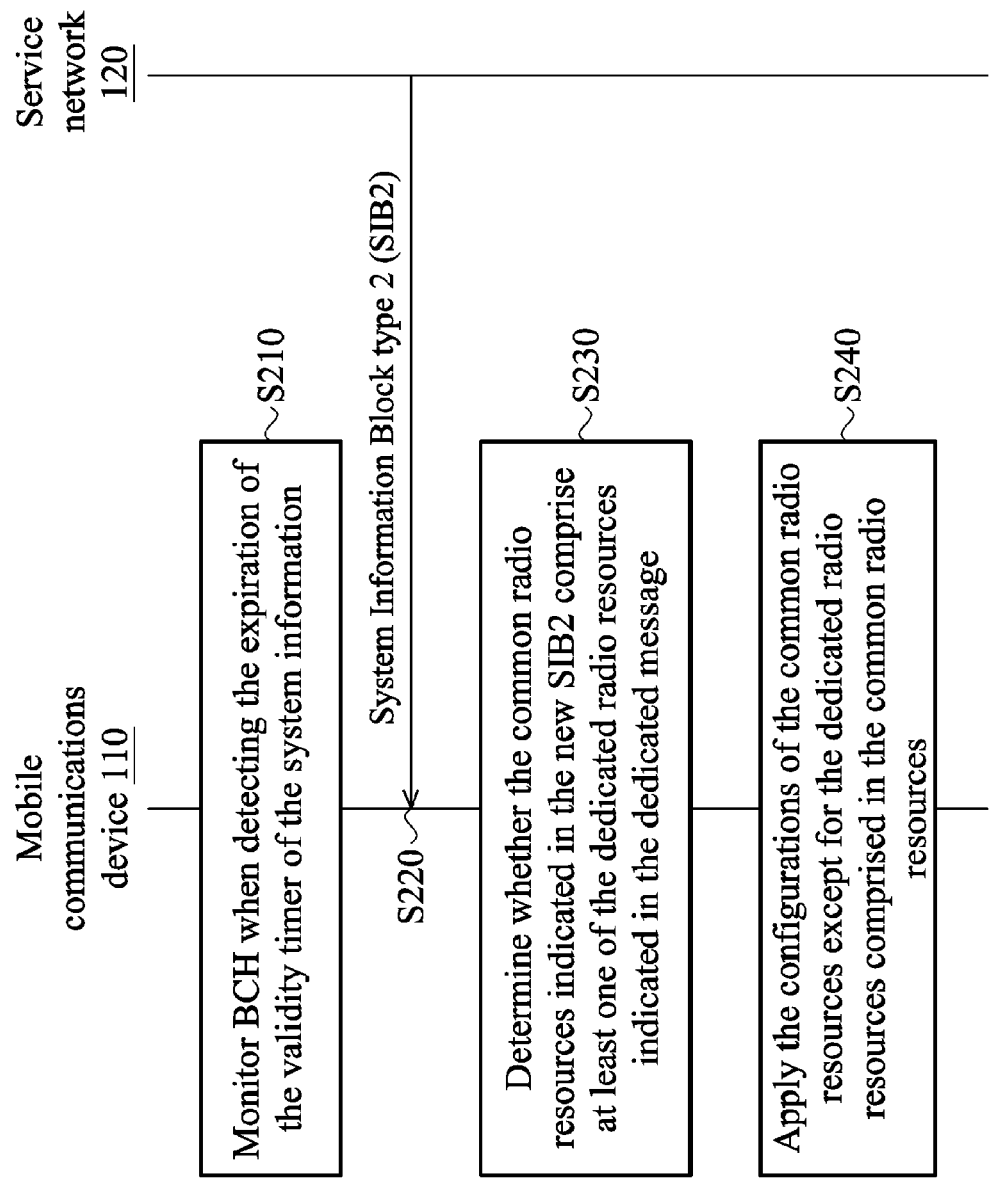
FIG. 2 is a message sequence chart illustrating a system information update procedure for a connected mode according to an embodiment of the invention.

To be more specific, the controller module 112 controls the wireless module 111 for performing a system information update procedure with the service network 120. FIG. 2 is a message sequence chart illustrating a system information update procedure for a connected mode according to an embodiment of the invention. In this embodiment, the service network 120 may be an LTE network and the mobile communication device 110 may be a UE in compliance with the TS 24.301 specification and/or other related specifications of the LTE technology. Alternatively, the mobile communication device 110 may be a UE in compliance with the specifications of the LTE technology and other wireless technologies, e.g., the GSM and WCDMA technologies, and the invention is not limited thereto. Initially, the mobile communication device 110 is configured to operate in the connected mode according to the configurations of the dedicated radio resources included in a dedicated message received from the service network 120. In one embodiment, the dedicated message may be a Radio Resource Control (RRC) CONNECTION RECONFIGURATION message. Note that, the system information has been received when the mobile communication device 110 is previously configured in the idle mode after being powered on. In certain situations, e.g. the validity timer of the system information has been expired, or a paging message indicating changes of the system information has been received, the UE considers the previously received (or originally stored) system information as invalid and starts the system information update procedure. To start the system information update procedure for connected mode, the controller module 112 instructs the wireless module 111 to monitor the Broadcast Channel (BCH) when detecting that the expiration of the validity timer of the system information has occurred (step S210). In one embodiment, the validity timer of the system information may start to count a valid period of time, for as long as 3 hours, i.e., the validity timer of the system information expires after the SIB2 has been received for 3 hours. Subsequently, the controller module 112 receives a new SIB2 comprising the configurations of the common radio resources from the service network 120 via the wireless module 111 (step S220). In response to the new SIB2, the controller module 112 determines whether the common radio resources indicated in the new SIB2 comprise at least one of the dedicated radio resources indicated in the dedicated message (step S230), and applies the configurations of the common radio resources indicated in the new SIB2 except for the dedicated radio resources which is indicated in the dedicated message and is comprised in the common radio resources indicated in the new SIB2 (step S240). For example, if the dedicated radio resources indicated in the dedicated message include the Physical Uplink Control CHannel (PUCCH) and the Physical Downlink Shared CHannel (PDSCH), and the common radio resources indicated in the new SIB2 include the Physical Uplink Shared CHannel (PUSCH), PUCCH, and PDSCH, then the controller module 112 only applies the configurations of the PUSCH indicated in the new SIB2, and keeps the configurations of the PUCCH and PDSCH indicated in the dedicated message unchanged.

Figure 3:
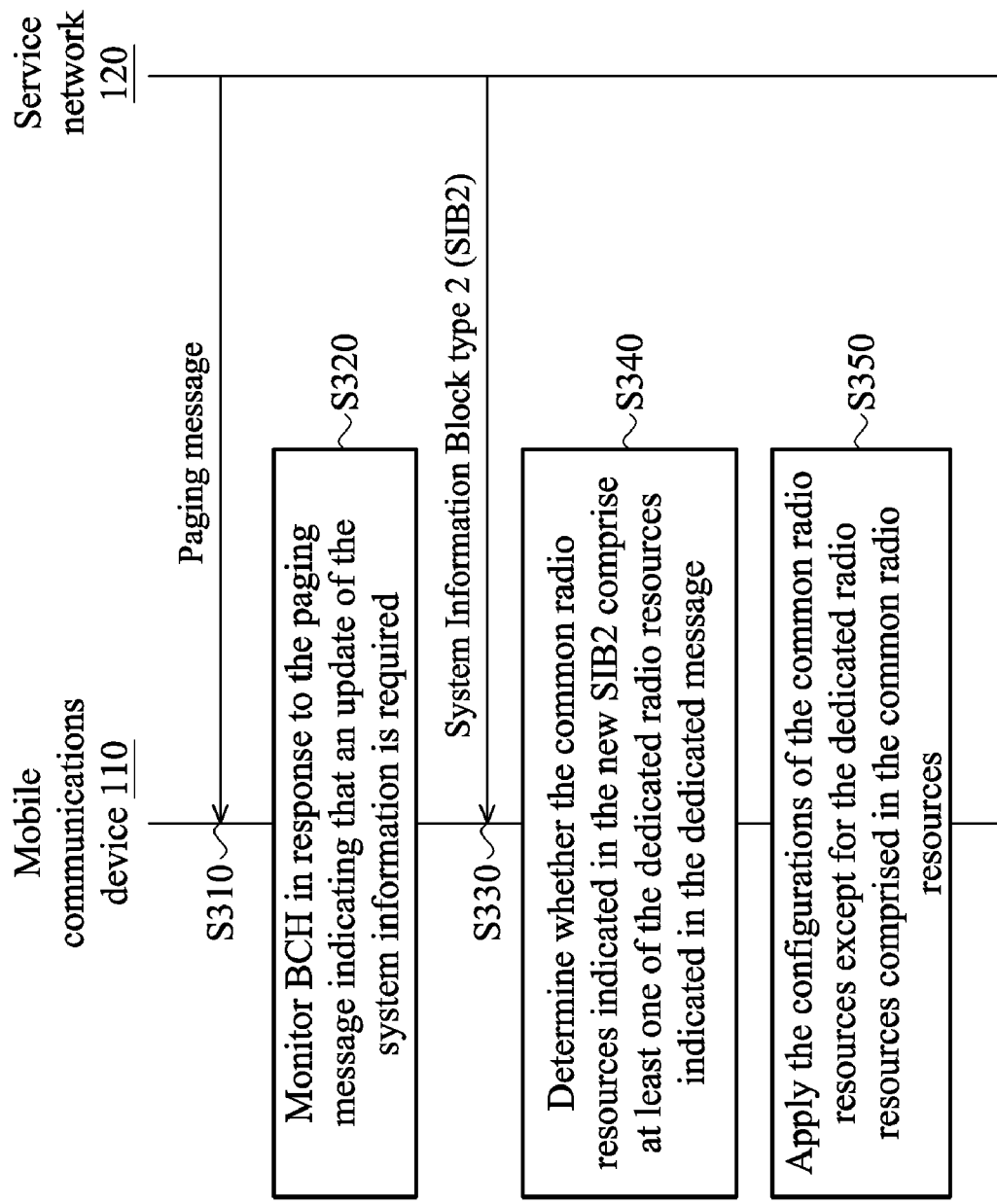
FIG. 3 is a message sequence chart illustrating a system information update procedure for a connected mode according to another embodiment of the invention.

FIG. 3 is a message sequence chart illustrating a system information update procedure for a connected mode according to another embodiment of the invention. Similar to FIG. 2, the service network 120 may be an LTE network and the mobile communication device 110 may be a UE in compliance with the TS 24.301 specification and/or other related specifications of the LTE technology. Initially, the mobile communication device 110 is configured to operate in the connected mode according to the configurations of the dedicated radio resources included in a dedicated message received from the service network 120. In one embodiment, the dedicated message may be an RRC CONNECTION RECONFIGURATION message. Note that, the system information, has been received when the mobile communication device 110 is previously configured in the idle mode after being powered on. To start the system information update procedure for the connected mode, the controller module 112 first receives, from the service network 120, a paging message indicating that an update of the broadcast system information is required (step S310). In response to the paging message, the controller module 112 instructs the wireless module 111 to monitor the BCH (step S320). Specifically, the controller module 112 may instruct the wireless module 111 to monitor the BCH in the next modification period of the system information, which comprises a number of radio frames for carrying the broadcast of the system information. Regarding the detailed description of the modification period of the system information, reference may be made to the TS 24.301 specification as it is beyond the scope of the invention. Next, the controller module 112 receives a new SIB2 comprising the configurations of the common radio resources from the service network 120 via the wireless module 111 (step S330). The controller module 112 then determines whether the common radio resources indicated in the new SIB2 comprise at least one of the dedicated radio resources indicated in the dedicated message (step S340), and applies the configurations of the common radio resources indicated in the new SIB2 except for the dedicated radio resources which is indicated in the dedicated message and is comprised in the common radio resources indicated in the new SIB2 (step S350). For example, if the dedicated radio resources indicated in the dedicated message include the PUCCH and PUCCH, and the common radio resources indicated in the new SIB2 include the PUSCH, PUCCH, and PDSCH, then the controller module 112 only applies the configurations of the PDSCH indicated in the new SIB2, and keeps the configurations of the PUSCH and PUCCH indicated in the dedicated message unchanged.

Figure 4:
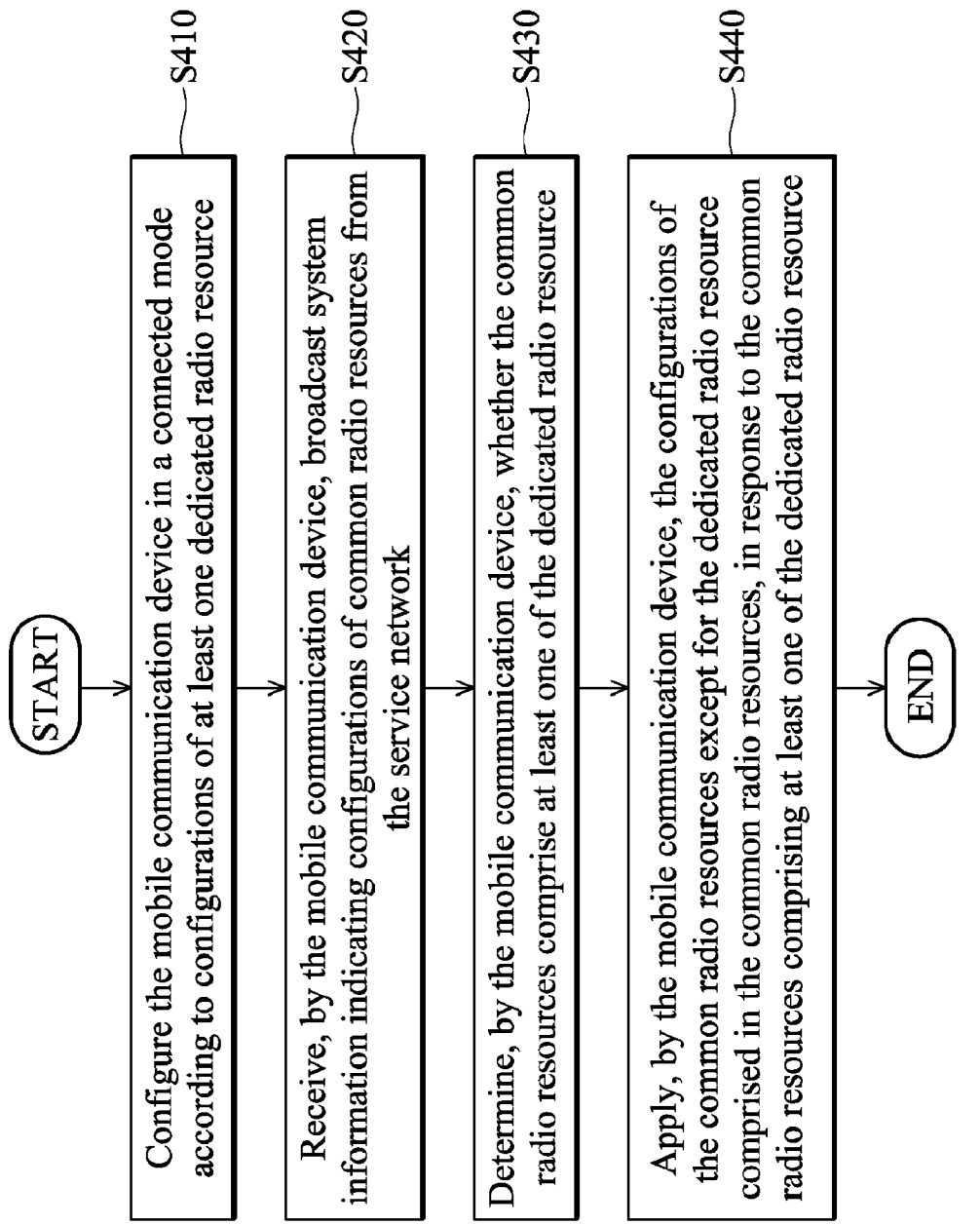
FIG. 4 is a flow chart illustrating a method for updating configurations of radio resources by a mobile communication device according to an embodiment of the invention.

FIG. 4 is a flow chart illustrating a method for updating configurations of radio resources by a mobile communication device according to an embodiment of the invention. In this embodiment, the mobile communication device is wirelessly connected to a service network for obtaining wireless access services. The service network may be an LTE network and the mobile communication device may be a UE in compliance with the TS 24.301 specification and/or other related specifications of the LTE technology. Alternatively, the mobile communication device may be a UE in compliance with the specifications of the LTE technology and other wireless technologies, e.g., the GSM and WCDMA technologies, and the invention is not limited thereto. To begin, the mobile communication device is first configured in the connected mode according to the configurations of at least one dedicated radio resource (step S410). Specifically, the configurations of the dedicated radio resource may be included in an RRC CONNECTION RECONFIGURATION message received from the service network before the start of the method. Subsequently, the mobile communication device receives a broadcast system information indicating the configurations of the common radio resources from the service network (step S420). Specifically, the broadcast system information may comprise a SIB2 which contains the configurations of the common radio resources. In response to the broadcast system information, the mobile communication device determines whether the common radio resources comprise at least one of the dedicated radio resource (step S430). In this embodiment, since the common radio resources comprise at least one of the dedicated radio resource, the mobile communication device applies the configurations of the common radio resources, except for the dedicated radio resource comprised in the common radio resources (step S440). For example, if the dedicated radio resource includes the PUCCH, and the common radio resources include the PUSCH, PUCCH, and PDSCH, then the mobile communication device may only apply the configurations of the PUCCH and PDSCH as indicated in the broadcast system information, and keeps the configurations of the PUCCH unchanged. In another embodiment, if the common radio resources do not comprise any one of the dedicated radio resource, the mobile communication device may directly apply the configurations of the common radio resources as indicated in the broadcast system information.

Note that, the reception of the broadcast system information in step S420 may be performed in response to the mobile communication device receiving a paging message indicating that an update of the broadcast system information is required. Specifically, the mobile communication device may monitor the BCH for receiving the broadcast system information when receiving the paging message. In another embodiment, the mobile communication device may have already received the broadcast system information when it was configured in the idle mode after being powered on, and a validity timer of the broadcast system information may have already started to count the valid period of time for the broadcast system information. In this regard, the broadcast system information received in step S420 may be a new broadcast system information which includes updated information concerning the configurations of the common radio resources, and the reception of the new broadcast system information may be performed in response to detecting the expiration of the validity timer of the broadcast system information.

While the invention has been described by way of example and in terms of preferred embodiment, it is to be understood that the invention is not limited thereto. Those who are skilled in this technology can still make various alterations and modifications without departing from the scope and spirit of this invention. For example, the method for updating configurations of radio resources may also be applied for mobile communication devices and service networks which are in compliance with the LTE-Advanced technology, or any evolutionary technology of the WCDMA/LTE technology family. Therefore, the scope of the present invention shall be defined and protected by the following claims and their equivalents.

What is claimed is:

1. A mobile communication device, comprising:
    a wireless module performing wireless transceiving to and from a service network; and
    a controller module, configured in a connected mode according to configurations of at least one dedicated radio resource, receiving broadcast system information indicating configurations of common radio resources from the service network via the wireless module, determining whether the common radio resources comprise at least one of the dedicated radio resource, and applying the configurations of the common radio resources, except for the dedicated radio resource comprised in the common radio resources, in response to the common radio resources comprising at least one of the dedicated radio resource.

2. The mobile communication device of claim 1, wherein the controller module further applies the configurations of the common radio resources, in response to the common radio resources not comprising any one of the dedicated radio resource.

3. The mobile communication device of claim 1, wherein the reception of the broadcast system information is performed in response to receiving, from the service network via the wireless module, a paging message indicating that an update of the broadcast system information is required.

4. The mobile communication device of claim 1, wherein the reception of the broadcast system information is performed in response to a validity timer of last received broadcast system information being expired.

5. The mobile communication device of claim 4, wherein each of the last received broadcast system information and the broadcast system information network.

6. The mobile communication device of claim 4, wherein the validity timer is started when the last received broadcast system information is received, and is expired when the time of the reception of the last received broadcast system information has passed for 3 hours.

7. The mobile communication device of claim 1, wherein the dedicated radio resource comprises any combination of the following: Physical Uplink Shared CHannel (PUSCH); Physical Uplink Control CHannel (PUCCH); and Physical Downlink Shared CHannel (PDSCH).

8. The mobile communication device of claim 1, wherein the configurations of the dedicated radio resource is included in a Radio Resource Control (RRC) CONNECTION RECONFIGURATION message received from the service network.

9. A method for updating configurations of radio resources by a mobile communication device wirelessly connected with a service network, comprising:
configuring the mobile communication device in a connected mode according to configurations of at least one dedicated radio resource;
receiving, by the mobile communication device, broadcast system information indicating configurations of common radio resources from the service network;
determining, by the mobile communication device, whether the common radio resources comprise at least one of the dedicated radio resource; and
applying, by the mobile communication device, the configurations of the common radio resources, except for the dedicated radio resource comprised in the common radio resources, in response to the common radio resources comprising at least one of the dedicated radio resource.

10. The method of claim 9, further comprising applying the configurations of the common radio resources, in response to the common radio resources not comprising any one of the dedicated radio resource.

11. The method of claim 9, wherein the step of receiving the broadcast system information is performed in response to receiving, from the service network, a paging message indicating that an update of the broadcast system information is required.

12. The method of claim 9, wherein the step of receiving the broadcast system information is performed in response to a validity timer of last received broadcast system information being expired.

13. The method of claim 12, wherein each of the last received broadcast system information and the broadcast system information comprises a respective System Information Block type 2 (SIB2) of the service network.

14. The method of claim 12, wherein the validity timer is started when the last received broadcast system information is received, and is expired when the time of the reception of the last received broadcast system information has passed for 3 hours.

15. The method of claim 9, wherein the dedicated radio resource comprises any combination of the following:
Physical Uplink Shared CHannel (PUSCH);
Physical Uplink Control CHannel (PUCCH); and
Physical Downlink Shared CHannel (PDSCH).

16. The method of claim 9, wherein the configurations of the dedicated radio resource is included in a Radio Resource Control (RRC) CONNECTION RECONFIGURATION message received from the service network.

* * * * *